(12) United States Patent
Wietharn (10) Patent No.: US 11,299,002 B2
(45) Date of Patent: Apr. 12, 2022

(54) CENTER LINK FOR ARTICULATED TRUCK SUSPENSION MOUNTS

(71) Applicant: Caterpillar Inc., Peoria, IL (US)

(72) Inventor: Ross Paul Wietharn, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 74 days.

(21) Appl. No.: 16/671,761

(22) Filed: Nov. 1, 2019

(65) Prior Publication Data

US 2021/0129618 A1 May 6, 2021

(51) Int. Cl.
*B60G 5/00* (2006.01)
*B60G 21/00* (2006.01)

(52) U.S. Cl.
CPC .................... *B60G 21/00* (2013.01)

(58) Field of Classification Search
CPC ........ B60G 21/00; B60G 11/22; B60G 11/24; B60G 11/40; B60G 2200/318; B60G 2202/14; F16F 1/40; F16F 2230/007
USPC .......................................... 411/380, 537, 171
See application file for complete search history.

(56) References Cited

U.S. PATENT DOCUMENTS

| | | | | |
|---|---|---|---|---|
| 3,677,535 A | * | 7/1972 | Beck ......................... | F16F 1/40 267/294 |
| 5,228,664 A | | 7/1993 | Moulinet | |
| 5,641,153 A | * | 6/1997 | Gwinn ................... | B60G 13/02 267/140.13 |
| 5,676,356 A | | 10/1997 | Ekonen | |
| 8,256,795 B2 | | 9/2012 | Moriyama et al. | |
| 2004/0113338 A1 | * | 6/2004 | Wietharn ................ | F16F 1/403 267/141.1 |
| 2007/0145654 A1 | * | 6/2007 | Wietharn ................ | F16F 1/403 267/141.1 |
| 2010/0270719 A1 | * | 10/2010 | Ranum ................... | B60G 5/053 267/294 |
| 2018/0290668 A1 | | 10/2018 | Lindenberg | |

FOREIGN PATENT DOCUMENTS

| | | | |
|---|---|---|---|
| CN | 201427508 | 3/2010 | |
| CN | 102529634 A | 7/2012 | |
| DE | 19608860 A1 * | 9/1997 | ............... F16F 1/40 |
| KR | 2012060023 A | 6/2012 | |
| WO | 9401695 | 1/1994 | |
| WO | WO-2007004949 A1 * | 1/2007 | ............ B60G 5/053 |
| WO | 2019170844 | 9/2019 | |

* cited by examiner

*Primary Examiner* — Paul N Dickson
*Assistant Examiner* — Maxwell L Meshaka
(74) *Attorney, Agent, or Firm* — Law Office of Kurt J. Fugman LLC (57) ABSTRACT

A center link has a bolt portion contact pad extending longitudinally and transversely from the bolt portion, forming a bolt portion contact surface extending transversely, and defining a bolt portion contact surface transverse width that is less than the shaft portion transverse width. The center link also has a mushroom head portion contact pad extending longitudinally and transversely from the mushroom head portion, forming a mushroom head portion contact surface, and defining a mushroom head portion contact surface transverse width that is less than the shaft portion transverse width.

15 Claims, 7 Drawing Sheets

CENTER LINK FOR ARTICULATED TRUCK SUSPENSION MOUNTS

TECHNICAL FIELD

The present disclosure relates generally to methods for making machines and attaching a suspension to the machine. More specifically, the present disclosure relates to devices and methods for mounting a suspension to the frame of a machine using suspension mounts having a center link.

BACKGROUND

Many machines use suspension mounts for attaching a suspension system to the frame of the machine. Articulated dump trucks (or haul trucks) in particular frequently use suspension mounts that include a matrix that includes both stiffening elements and a resilient material that bonds the stiffening elements together. The matrix supports compressive loads and resists tensile loads to a limited degree. When side loads or compressive loads are applied to the suspension mount, a center link that is disposed within the hollow interior of the matrix of stiffening elements and resilient material helps to limit the amount of strain on the matrix, which could cause the matrix to fatigue. The center link also supports tensile loads.

In such applications, extreme motions and high compressive loads and/or shock loads may be applied to the suspension mount and to its center link. These conditions may cause large force moments on the center link. The resulting bending stresses may be very damaging and can shorten life of the center link and/or its associated suspension mount. Compromise of the center link may result in suspension problems, and necessitate mount replacement as well as machine downtime.

U.S. Pat. No. 8,256,795 discloses a suspension mount that may limit the amount of compressive force and bending stresses exerted on the center link. To that end, the center link is formed by an assembly including a bottom U-shaped latch, a top bolt with a nut secured to the bolt, and a chain link member connecting these components together. Consequently, the center link acts similar to a chain, supporting tensile loads, but collapses when compressive loads and strains are applied to it. Therefore, no bending stresses or compressive stresses are exerted on the center link assembly. However, the matrix is thus subjected to compressive loads and side loads without reinforcement, undesirably making the matrix more susceptible to damage.

Accordingly, an apparatus that reduces the bending stresses on a center link while also providing suitable support to the matrix is still warranted.

SUMMARY OF THE DISCLOSURE

A center link for use with a suspension mount assembly according to an embodiment of the present disclosure is provided. The center link may comprise a shaft portion defining a longitudinal axis and a transverse axis perpendicular to the longitudinal axis, a first axial end disposed along the longitudinal axis, a second axial end disposed along the longitudinal axis, and a shaft portion transverse width. A bolt portion may be disposed at either the first axial end or the second axial end. The bolt portion may define a bolt portion transverse width, and may include a bolt portion contact pad extending longitudinally and transversely from the bolt portion, forming a bolt portion contact surface extending transversely, and defining a bolt portion contact surface transverse width that is less than the shaft portion transverse width.

A center link for use with a suspension mount assembly according to another embodiment of the present disclosure is provided. The center link may comprise a shaft portion defining a longitudinal axis and a transverse axis perpendicular to the longitudinal axis, a first axial end disposed along the longitudinal axis, a second axial end disposed along the longitudinal axis, and a shaft portion transverse width. A mushroom head portion may be disposed at either the first axial end or the second axial end. The mushroom head portion may define a mushroom head portion transverse width, and may include a mushroom head portion contact pad extending longitudinally and transversely from the bolt portion, forming a mushroom head portion contact surface, and defining a mushroom head portion contact surface transverse width that is less than the shaft portion transverse width.

A suspension mount assembly according to an embodiment of the present disclosure is provided. The suspension mount assembly may have an interior and an exterior, and may comprise a first mounting member including a first mounting flange portion and a first bowl shaped portion extending from the first mounting flange portion toward the interior of the suspension mount assembly. A second mounting member may include a second mounting flange portion and a second bowl shaped portion extending from the second mounting flange portion toward the first bowl shaped portion of the first mounting member. A matrix may join the first mounting member to the second mounting member. The matrix may include a plurality of stiffening members and a resilient material joining the stiffening members together, the matrix defining an interior void that extends from the first mounting member to the second mounting member. A center link may be disposed in the interior void engaging the first bowl shaped portion and the second bowl shaped portion. The center link may include a first contact pad disposed proximate the first bowl shaped portion and facing away from the first bowl shaped portion, and a second contact pad disposed proximate the second bowl shaped portion and facing away from the second bowl shaped portion. The first contact pad and the second contact pad may face at least partially in opposite directions relative to each other.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a suspension mount assembly and a center link that may be used with that suspension mounting assembly will now be discussed. In particular, the center link may have one or more raised contact pads that concentrate compressive loads close to the central axis (may also be referred to as the neutral axis) of the center link under all motion conditions including slanted extreme positions. This may significantly reduce the force moments that cause high bending stresses and may result in a significant increase in life of the center link and the suspension mount assembly. First, a machine that may use such embodiments will be described.

Looking at FIGS. 1 thru 4, a machine 100 in the form of an articulated dump truck includes a suspension mount assembly 200 as well as center links 300 (not shown in FIGS. 1 thru 4) used in the suspension mount assembly 200 according to various embodiments of the present disclosure.

The machine 100 may include a cab 102, an engine 104, an axle A-frame bearing 106 positioned at an articulated joint 108 that allows the rear bed frame 110 to swivel about a vertical axis 112 as well as a horizontal axis (e.g. a fore-aft axis passing horizontally through the center of the hitch). A payload bucket 113 that may hold material such as dirt, rocks, etc. may be pivotally connected to the rear of the rear bed frame 110.

Conical bushings 114 may be provided to connect the suspension assembly 116 to the rear bed frame 110. More specifically, the suspension assembly 116 may include equalizing beams 118 that use the conical bushings 114 to mate with the rear bed frame 110. The suspension assembly 116 may further include a plurality of suspension mount assemblies 200 that connect the axles 122 or other parts of the suspension assembly 116 to the equalizing beams 118 or other parts of the suspension assembly 116 or frame. The loads exerted on the suspension assembly 116 via the ground through the tires 124 or via the payload bucket 112 through the equalizing beams 118 are absorbed by the suspension mount assemblies 200 according to various embodiments of the present disclosure.

It is to be understood that other types of machines that use suspension assemblies including non-articulated trucks, cars, wheel loaders, etc. may use the embodiments of the present disclosure. Hence, this machine is provided as a non-limiting example.

Figure 1:
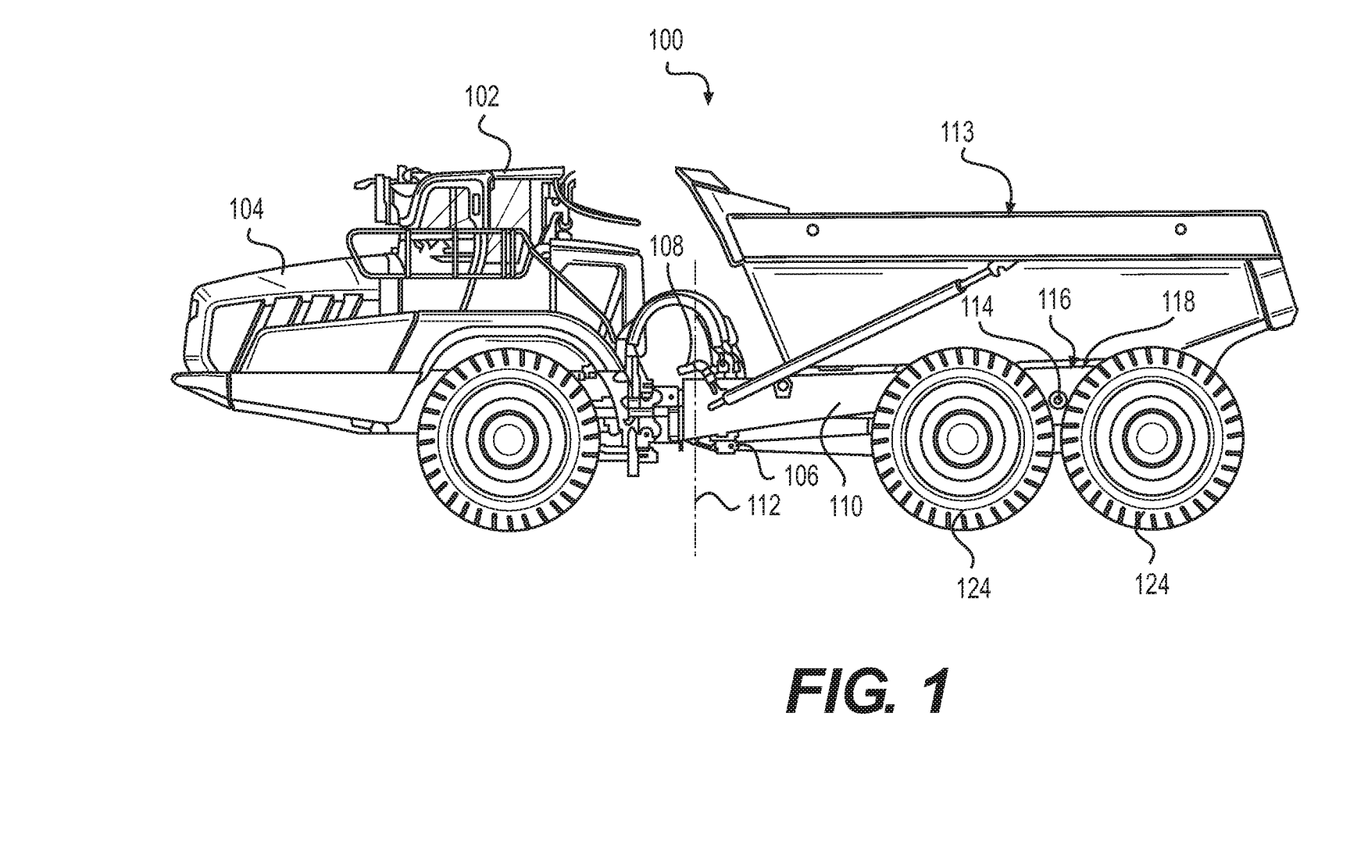
FIG. 1 is a side view of a machine in the form of an articulated dump truck that may employ a suspension mount having a center link configured according to various embodiments of the present disclosure.
Figure 2:
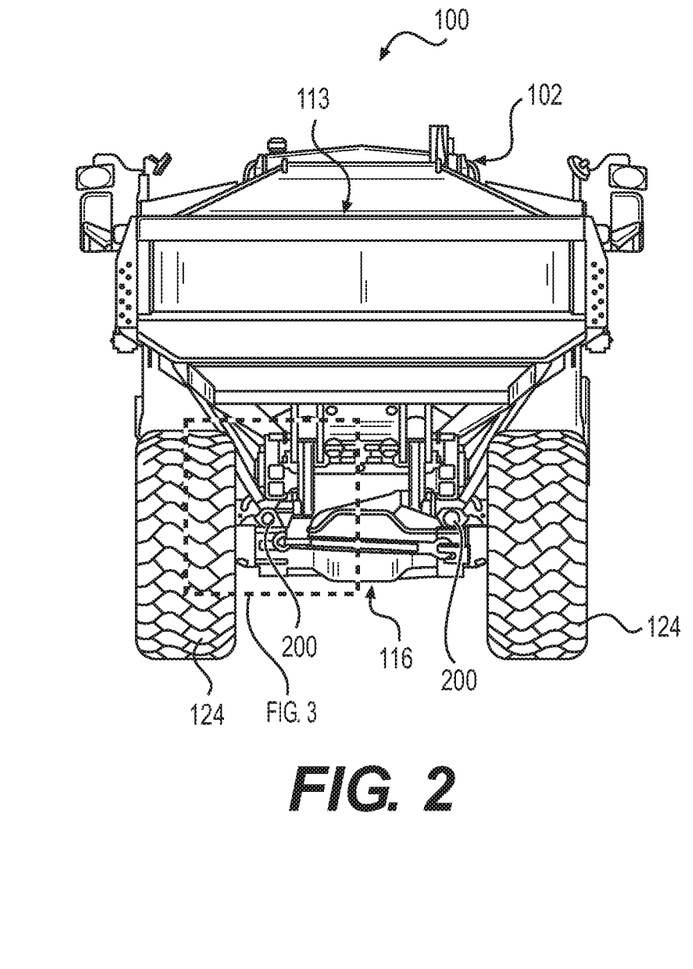
FIG. 2 is a rear view of the machine of FIG. 1 showing rear instances of the suspension mounts.
Figure 3:
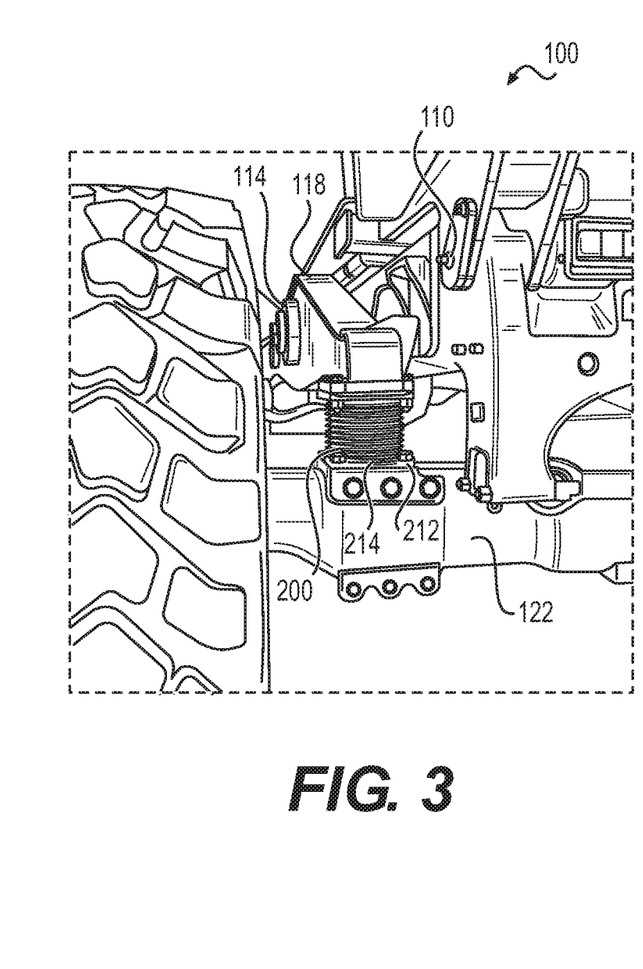
FIG. 3 is an enlarged detail view showing the left instance of the suspension mount of FIG. 2 more clearly.
Figure 4:
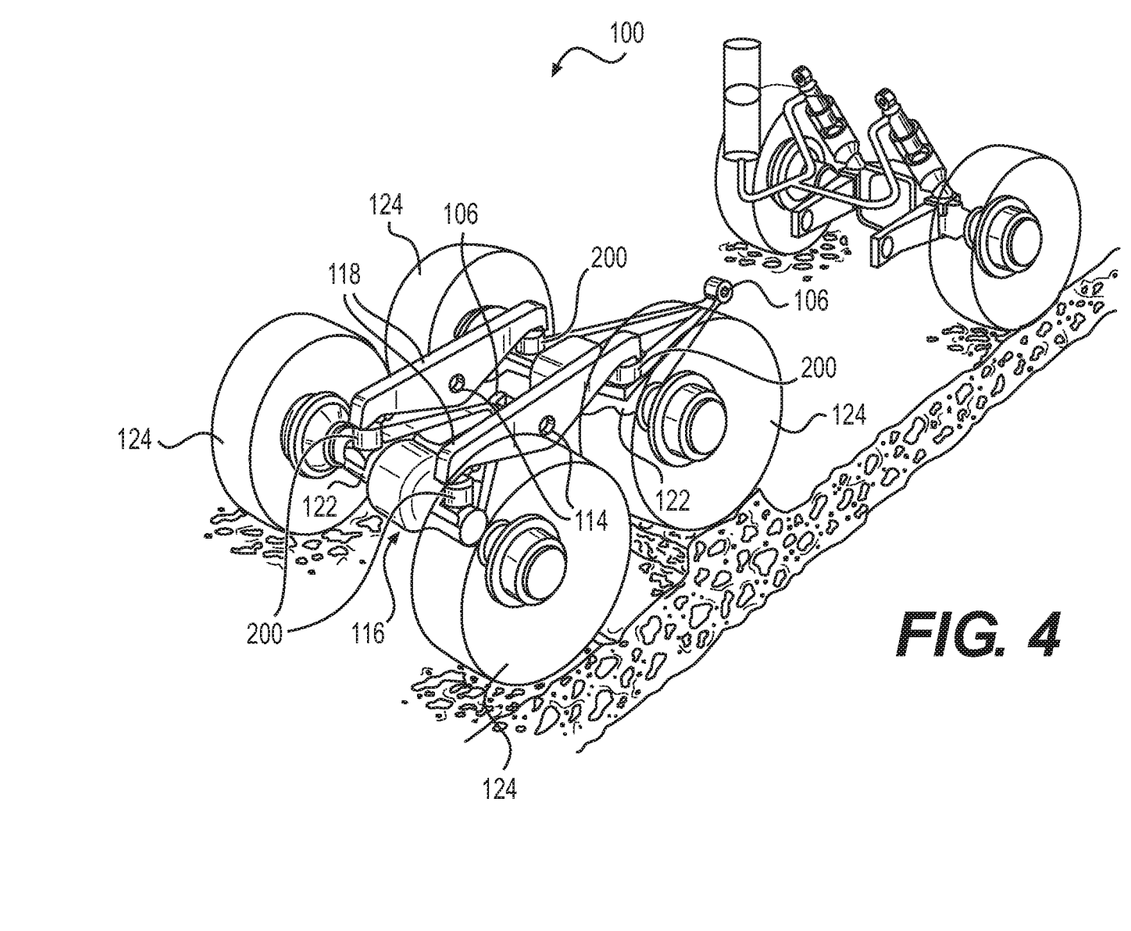
FIG. 4 is a perspective schematic view of the suspension system of the machine of FIG. 2 shown in isolation from the upper portion of the machine for enhanced clarity.
Figure 5:
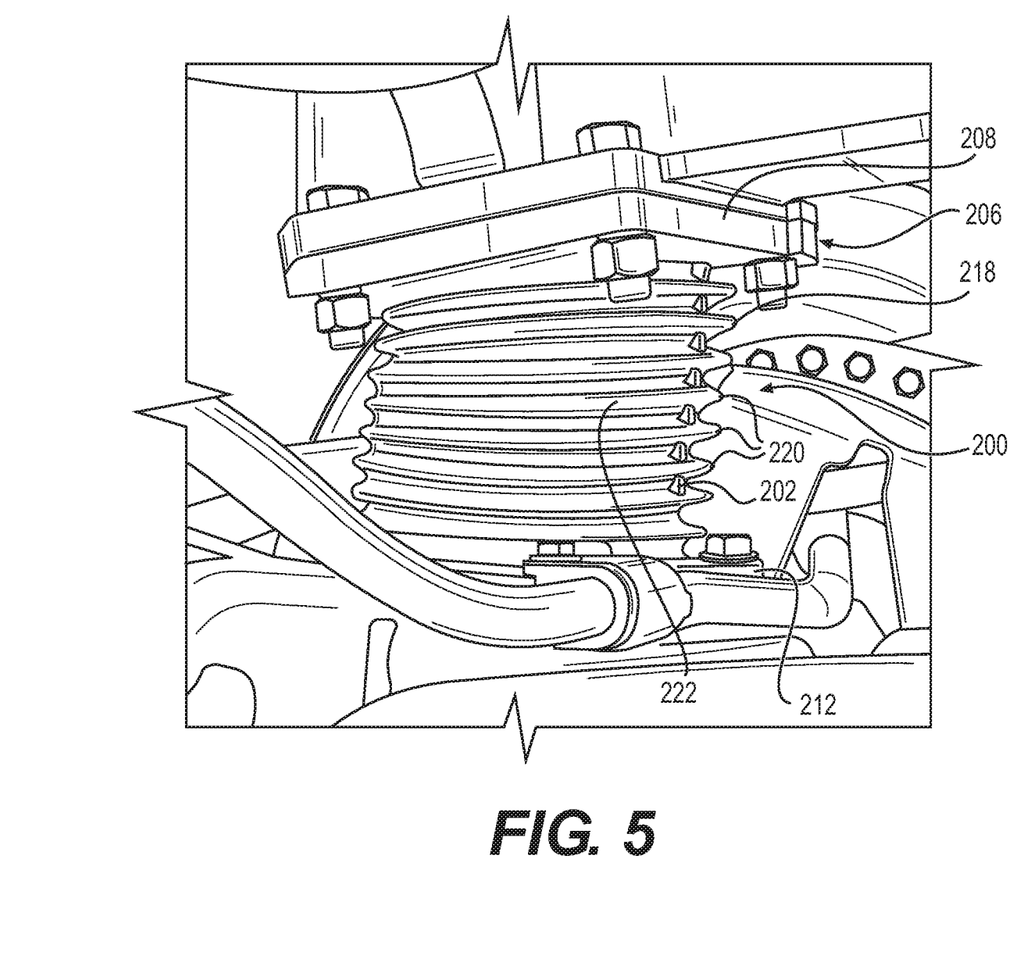
FIG. 5 is a zoomed perspective view of a suspension mount employing a center link surrounded by a matrix that includes both stiffening elements and a resilient material that bonds the stiffening elements together according to various embodiments of the present disclosure. This figure shows motions imparted to the suspension mount by adjacent suspension components.
Figure 6:
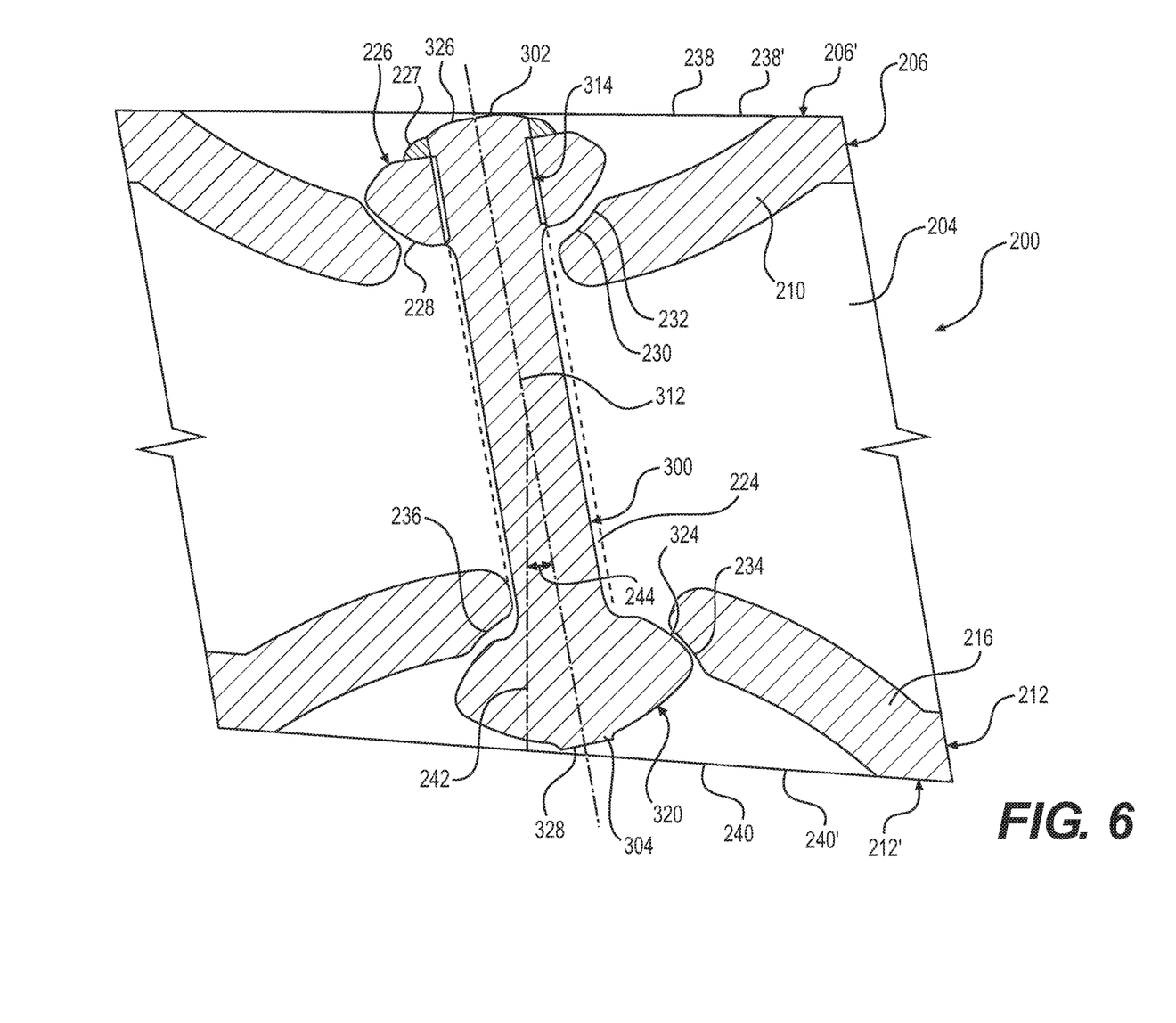
FIG. 6 is sectional view of a suspension mount similar to that of FIG. 5 with the matrix of stiffening elements and resilient material removed for enhanced clarity. The center link contacts the bowl shaped portions of the upper mounting member and the lower mounting member when the suspension mount is placed under tension. The center link contacts various components of the suspension or the frame of the machine when the suspension mount is placed under compression due to heavy loads or shock loads. The center link is shown in an extreme position such that the center link is slanted, maximizing the amount of bending stresses created by compressive forces exerted on the center link.

Looking now at FIGS. 5 and 6, a suspension mount assembly according to various embodiments of the present disclosure may have an interior 204 and an exterior 202. The suspension mount assembly 200 may comprise a first mounting member 206 including a first mounting flange portion 208 (may have a rectangular or square configuration) and a first bowl shaped portion 210 (e.g. bowl shaped may be any suitable shape including conical, spherical, other arcuate shapes, etc.) extending from the first mounting flange portion 208 toward the interior 204 of the suspension mount assembly 200. Similarly, a second mounting member 212 may be provided that includes a second mounting flange portion 214 (may be similarly configured as the first mounting flange portion, see FIG. 2) and a second bowl shaped portion 216 (may be similarly shaped as the first bowl shaped portion) extending from the second mounting flange portion 214 toward the first bowl shaped portion 210 of the first mounting member 206.

In other embodiments of the present disclosure, one or more of the mounting members may be purely flat, etc.

Referring to FIG. 5, a matrix 218 (e.g. a composite) may join the first mounting member 206 to the second mounting member 212, at least partially defining the exterior 202 and the interior 204 of the suspension mount assembly 200. The matrix 218 typically includes a plurality of stiffening members 220 (e.g. steel plates) and a resilient material 222 (e.g. rubber, thermoset, etc.) joining the stiffening members 220 together to provide load bearing capabilities. As shown in FIG. 6, the matrix 218 may define an interior void 224 that extends from the first mounting member 206 to the second mounting member 212.

As seen in FIG. 6, a center link 300 may be disposed in the interior void 224 engaging the first bowl shaped portion 210, and the second bowl shaped portion 216 (either engaging directly as shown at the bottom of FIG. 6 or indirectly as shown at the top of FIG. 6). The center link 300 may include a first contact pad 302 that is disposed proximate the first bowl shaped portion 210, and facing away from the first bowl shaped portion 210. Similarly, a second contact pad 304 may be disposed proximate the second bowl shaped portion 216, and facing away from the second bowl shaped portion 216. The first contact pad 302 and the second contact pad 304 may face at least partially in opposite directions relative to each other. That is to say, these contact pads may define at least some surface normals that point in opposite directions.

Figure 7:
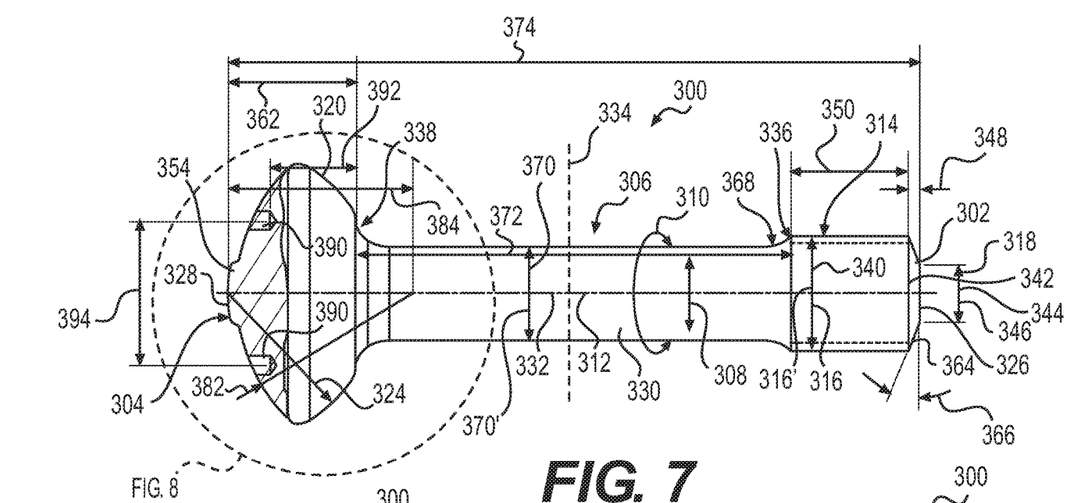
FIG. 7 is a front view of the center link of FIG. 6 shown in isolation from the suspension mount. Contact pads are shown at both axial ends of the center link according to various embodiments of the present disclosure.

Looking at FIGS. 6 and 7 together, the center link 300 may include an at least partially cylindrical body 306 defining a radial direction 308, a circumferential direction 310, and a cylindrical axis 312. Also, the center link 300 may further comprise a bolt portion 314 (i.e. an externally threaded portion) defining a bolt portion diameter 316 (measured in a plane parallel to the radial direction 308). At the same time, the first contact pad 302 may extend away from the bolt portion 314 (e.g. along the cylindrical axis 312), and may define a first contact pad diameter 318 (measured in a plane parallel to the radial direction 308) that is less than the bolt portion diameter 316, and less than the shaft portion transverse width 370' (e.g. shaft portion diameter 370). The shaft portion transverse width 370' may be less than the bolt portion diameter 316.

Figure 9:
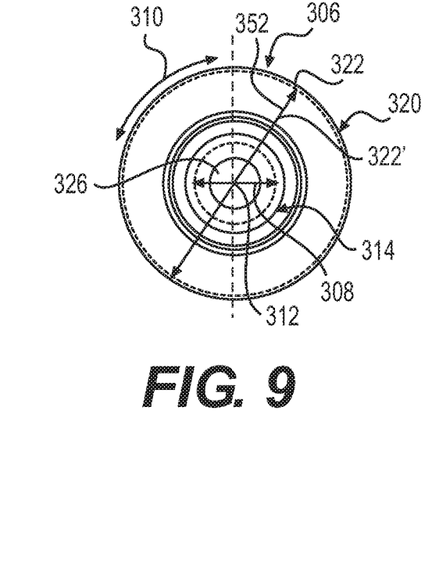
FIG. 9 is a right side view of the center link of FIG. 8, showing another view of the contact pad extending from the bolt portion.

Likewise, the center link 300 may have a mushroom head portion 320 defining a mushroom head portion diameter 322 (measured in a plane parallel to the radial direction 308, see FIG. 9), while the second contact pad 304 may extend away from the mushroom head portion 320 (e.g. along the cylindrical axis 312), defining a second contact pad diameter 324 (measured in a plane parallel to the radial direction 308, see FIG. 9) that is less than the mushroom head portion diameter 322, and less than the shaft portion transverse width 370' (e.g. shaft portion diameter 370). The shaft portion transverse width 370' may be less than the mushroom head portion diameter 370.

Other configurations of these various features are possible in other embodiments of the present disclosure (e.g. polygonal, etc.).

In FIG. 6, a nut 226 may be threaded onto the bolt portion 314 (and welded thereto via a weld bead 227). The nut 226 may include a nut arcuate surface 228 that is at least partially complimentarily shaped to contact the first bowl shaped portion 210. More specifically, the first bowl shaped portion 210 may define a first socket 230 that forms a nut engaging surface 232 that is at least partially complimentarily shaped as the nut arcuate surface 228. These features may be differently shaped or omitted in other embodiments of the present disclosure.

In like fashion, the mushroom head portion 320 may include a mushroom head portion arcuate surface 324 that is at least partially complimentarily shaped to contact the second bowl shaped portion 216. More particularly, the second bowl shaped portion 216 may define a second socket 234 that forms a mushroom head engaging surface 236 that is at least partially complimentarily shaped to the mushroom head portion arcuate surface 324. These features may be differently shaped or omitted in other embodiments of the present disclosure.

It is to be understood that the contact between these various surfaces may be interrupted or altered when the center link is shifted to extreme positions such as shown in FIG. 6. Also, both ends of the center link may be similarly configured as the other (e.g. both mushroom shaped or bolt shaped) or differently configured as shown in FIG. 6.

The suspension mount assembly 200 may further comprise a first suspension member 238 (e.g. the equalizing beam), and the first contact pad 302 may include a bolt portion contact surface 326 (may be planar or arcuate, etc.) that contacts the first suspension member 238 (may only make point or line contact in some instances). A second suspension member 240 (e.g. the axle) may be provided, and the second contact pad 304 may include a mushroom head portion contact surface 328 (may be planar or arcuate, etc.) that contacts the second suspension member 240 (may only make point or line contact in some instances). These various features may be differently configured in other embodiments of the present disclosure.

As used herein, the term "arcuate" is intended to refer to any curve that is not straight or flat including radial surfaces, spherical surfaces, elliptical surfaces, etc.

In FIG. 6, the suspension mount assembly 200 may define a vertical axis 242, and the cylindrical axis 312 of the center link 300 may form an oblique angle 244 with the vertical axis 242 such as when an extreme position is imposed on the suspension mount assembly 200 and its center link 300. In other cases, this angle may be zero such as when there is no lateral displacement. The first mounting member 206 may be an upper mounting member 206', while the second mounting member 212 may be lower mounting member 212'. Likewise, the first suspension member 238 may be an upper suspension member 238', and the second suspension member 240 may be a lower suspension member 240'. These orientations may be rotated 90 degrees so they are horizontal, or 180 degrees so that they are vertically reversed, etc. in other embodiments of the present disclosure.

Now, an embodiment of a center link 300 that may be provided as a replacement part for use with a suspension mount assembly 200 will be discussed with reference to FIGS. 7 thru 9.

The center link 300 may comprise a shaft portion 330 defining a longitudinal axis 332 and a transverse axis 334 that is perpendicular to the longitudinal axis 332. A first axial end 336 may be disposed along the longitudinal axis 332, and a second axial end 338 may be disposed along the longitudinal axis 332.

A bolt portion 314 may be disposed at either the first axial end 336 or the second axial end 338 (e.g. at the first axial end 336 as shown in FIG. 7), or both the first axial end 336 and the second axial end 338. The bolt portion 314 may define a bolt portion transverse width 340, and may include a bolt portion contact pad 342 that extends longitudinally and transversely from the bolt portion 314, forming a bolt portion contact surface 326 extending transversely. The bolt portion contact surface 326 may define a bolt portion contact surface transverse width 344 that is less than the bolt portion transverse width 340, and is less than the shaft portion transverse width 370' (e.g. shaft portion diameter 370).

Figure 8:
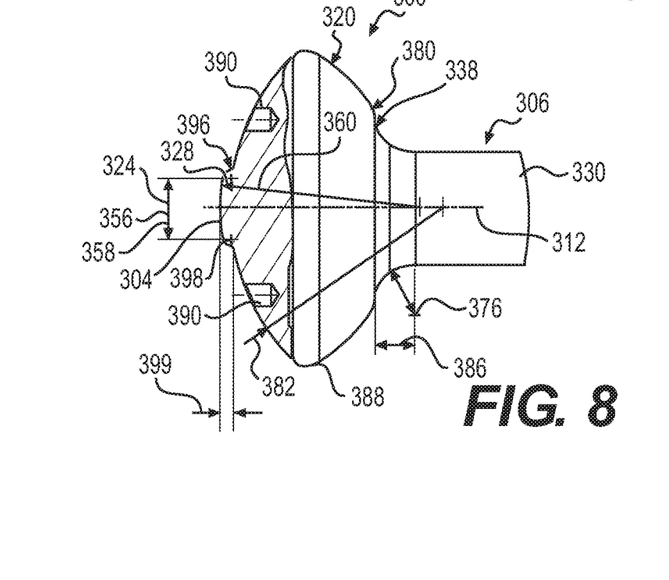
FIG. 8 is an enlarged detail view of the mushroom head portion of the center link of FIG. 7 having a contact pad extending from the mushroom head portion.

For the embodiment shown in FIGS. 7 thru 9, the shaft portion 330 includes an at least partially cylindrical configuration including a cylindrical axis 312 that is coincident with the longitudinal axis 332, a circumferential direction 310, and a radial direction 308 that is parallel to the transverse axis 334. Other configurations such as polygonal are possible in other embodiments of the present disclosure.

Since the center link 300 is at least partially cylindrical in FIGS. 7 thru 9, the bolt portion transverse width 340 is a bolt portion outer diameter 316' that is measured in the radial direction 308, and the bolt portion contact surface transverse width 344 is a bolt portion contact surface diameter 346 that is also measured in the radial direction 308.

In certain embodiments, a ratio of the shaft portion diameter 370 to the planar contact surface diameter 346 may range from 1.5 to 2.3 (e.g. 1.65). In such a case, the shaft portion diameter 370 may range from 23.0 mm to 34.0 mm (e.g. 33 mm), and the bolt portion contact surface diameter 346 may range from 10.0 mm to 22.0 mm (e.g. 20 mm). Other ratio and dimensional ranges are possible in other embodiments of the present disclosure.

Similarly, the bolt portion contact pad 342 may define a bolt portion contact pad axial width 348 measured along the cylindrical axis 312, while the bolt portion 314 may define a bolt portion axial width 350 measured along the cylindrical axis 312.

In certain embodiments, and a ratio of the shaft portion diameter 370 (or transverse width 370') to the bolt portion contact pad axial width 348 may range from 8.0 to 22.0 (e.g. about 10.0). In such a case, the bolt portion contact pad axial width 348 may range from 1.5 mm to 4.0 mm (e.g. 3.25 mm), and the bolt portion axial width 350 should be sufficiently large to help to ensure that the contact pad, rather than surface 364, weld bead 227, or nut 226, comes into contact with the adjacent mounting member when the center link is at its maximum angle relative to the axis normal to the mounting member. Other ratio and dimensional ranges are possible in other embodiments of the present disclosure.

In other embodiments of a center link 300 that may be provided as a replacement part, the center link 300 may have a mushroom head portion 320 disposed at either the first axial end 336 or the second axial end 338 of the shaft portion 330 (e.g. at the second axial end 338 as shown in FIG. 7), or both the first axial end 336 and the second axial end 338. The mushroom head portion 320 may define a mushroom head portion transverse width 352 (see FIG. 9), and a mushroom head portion contact pad 354 extending longitudinally and transversely from the mushroom head portion 320, forming an mushroom head portion contact surface 328. The mushroom head portion contact surface 328 may define an mushroom head portion contact surface transverse width 356 (see FIG. 8) that is less than the mushroom head portion transverse width 352, and is less than the shaft portion transverse width 370'. This may not be the case in other embodiments of the present disclosure.

As alluded to earlier herein, the center link 300 may have an at least partially cylindrical configuration. In such an embodiment, the mushroom head portion transverse width 352 is a mushroom head portion outer diameter 322' measured in the radial direction 308 (see FIG. 9), and the mushroom head portion contact surface transverse width 356 is an arcuate contact surface diameter 358 projected onto a plane parallel with the radial direction 308, being measured in the radial direction 308 (see FIG. 8).

In certain embodiments, a ratio of the shaft portion diameter 370 to the arcuate contact surface diameter 358 may range from 1.65 to 2.88 (e.g. about 1.83). In such a case, the shaft portion diameter may range from 23.0 mm to 34.0 mm (e.g. 33.0 mm), while the arcuate contact surface diameter 358 may range from 8.0 mm to 20.0 mm (e.g. 18.0 mm). Other ratio and dimensional ranges are possible in other embodiments of the present disclosure.

In certain embodiments, as best seen in FIG. 8, a ratio of the shaft portion diameter 370 to an arcuate contact pad axial width 399 (measured from the apex of the arcuate contact surface to where radius 396 intersects surface 382) may range from 6.6 to 16.5 (e.g. about 8.5). In such case, the arcuate contact pad axial width 399 may range from 2.0 mm to 5.0 mm (e.g. 3.9 mm). The arcuate contact pad axial width 399 may be sufficiently large enough to help the contact pad, rather than surface 382, comes into contact with the adjacent mounting member when the center link is at its maximum angle relative to an axis that is normal to the mounting member. Other ratio and dimensional ranges are possible in other embodiments of the present disclosure.

Moreover, as best seen in FIGS. 7 and 8, the mushroom head portion contact surface 328 may define an arcuate contact surface spherical radius 360, while the mushroom head portion 320 may define a mushroom head portion axial width 362 measured along the cylindrical axis 312.

In certain embodiments, a ratio of the arcuate contact surface spherical radius 360 to the shaft portion diameter 370 may range from 0.3 to 3.0 (e.g. 1.73). Similarly, the arcuate contact surface spherical radius 360 may range from 10.0 mm to 70.0 mm (e.g. 57.2 mm), and the shaft portion diameter 370 (or transverse width 370') may range from 23.0 mm to 34.0 mm (e.g. 33.0 mm). Other ratio and dimensional ranges are possible in other embodiments of the present disclosure.

The center link may be made from any suitable material such as metal (e.g. steel), etc.

Next, various additional dimensions of a center link 300 that may be useful in certain applications will be discussed.

In FIG. 7, it can be seen that an outer bolt transitional surface 364 is provided in the form of a chamfer (may be a radial blend in other embodiments, etc.) that extends from the bolt portion 314 to form the bolt portion contact pad 342. The chamfer angle 366 may range from 10.0° to 25.0°. Also, an inner bolt transitional surface 368 may be provided in the form of a radial blend that has a radius ranging from 5.0 mm to 20.0 mm. The shaft portion 330 defines a shaft portion diameter 370 that ranges from 23.0 mm to 34.0 mm, and a shaft portion length 372 (from the first axial end 336 to the second axial end 338) that ranges from 100.00 mm to 155.00 mm. The overall axial length 374 of the center link 300 may range from 170.0 mm to 250.0 mm.

Looking now at FIGS. 7 and 8, a combination radial blend including convex and concave portions may be provided at the second axial end 338 transitioning between the shaft portion 330 and the mushroom head portion 320. This combination radial blend may include a first concave radius 376 ranging from 5.0 mm to 20.0 mm, and a convex radius 380 ranging from 1.5 mm to 4.5 mm.

The mushroom head portion arcuate surface 324 may have a radius ranging from 35.0 mm to 55.0 mm. The center of this radius may be essentially (+/−0.5 mm) on the apex of the mushroom head portion contact surface 328. The outside arcuate surface 382 of the mushroom head portion 320 may have a radius ranging from 45.0 mm to 65.0 mm with its center being on the cylindrical axis 312 and being spaced away a predetermined distance 384 from the apex of the arcuate contact surface 324. Similarly, the center of the spherical radius 360 of the mushroom head portion contact surface 328 may also be coincident with the cylindrical axis 312, being spaced away from the mushroom head portion 320 an offset distance 386. An apex transitional surface 388 joins the mushroom head portion arcuate surface 324 to the outside arcuate surface 382 and may have a radius ranging from 2.5 mm to 10.0 mm.

Two fixture holes 390 may be provided that have a diameter of 6.35 mm and a depth that is spaced away from the second axial end 338 of the shaft portion 330 (not including the drill point) a dimension 392 of 29.5 mm to 31.5 mm. These fixture holes 390 may be radially spaced apart a radial distance 394 ranging from 50.3 mm to 60.3 mm.

A complex blend may be provided to transition from the outside arcuate surface 382 of the mushroom head portion 320 to the mushroom head portion contact surface 328. The is complex blend may include an outer concave radius 396 ranging from 2.0 mm to 3.5 mm, and an inner convex radius 398 ranging from 1.0 mm to 2.5 mm.

Again, any of the ratios, dimensions, configurations of various features, materials, etc. of any the embodiments specifically discussed herein are provided as a non-limiting example and may be different for other embodiments of the present disclosure.

INDUSTRIAL APPLICABILITY

In practice, a suspension mount assembly, a suspension assembly, a center link, and/or a machine may be sold or otherwise be provided according to any of the embodiments discussed herein in either an aftermarket or OEM (original equipment manufacturer) context.

Figure 10:
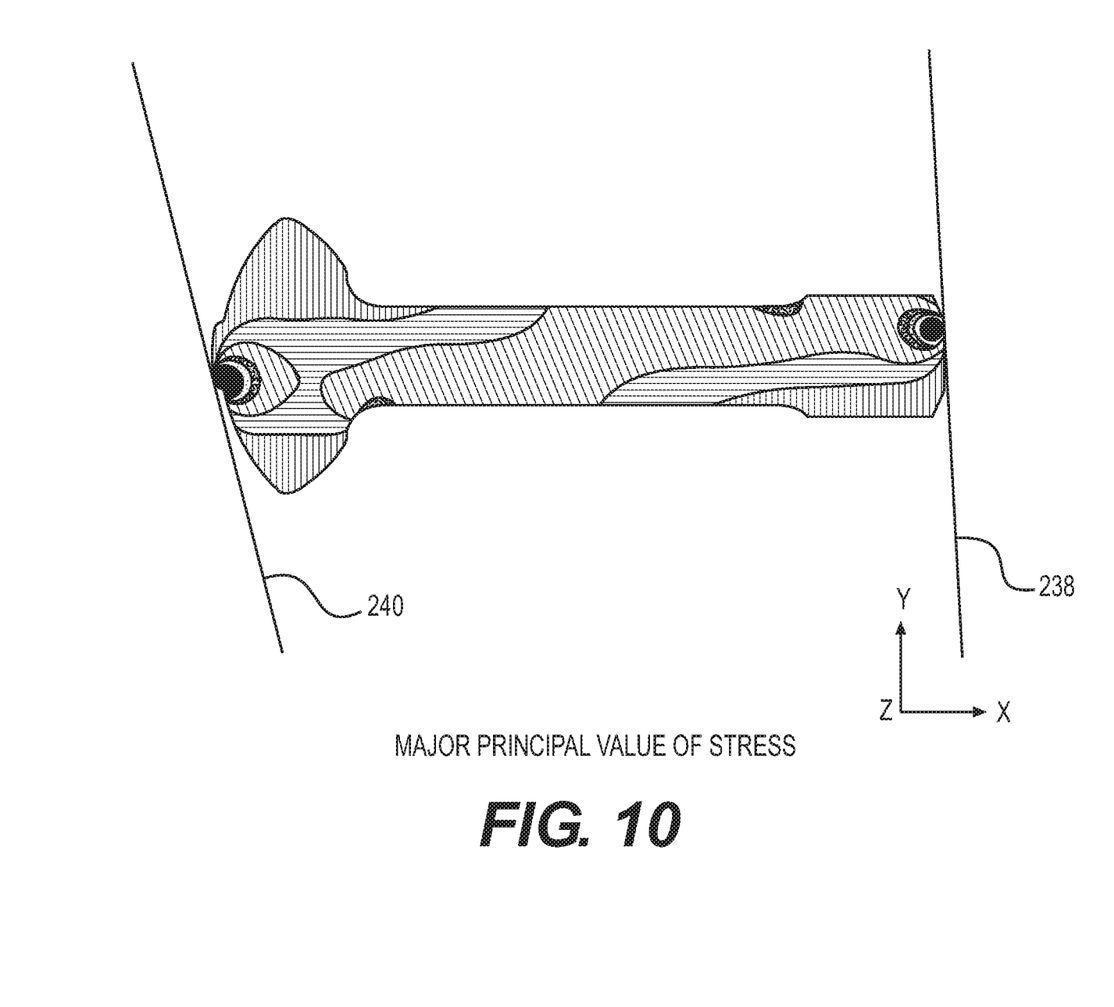
FIG. 10 is a FEA (finite element analysis) plot showing reduced bending stresses for the center link shown in FIG. 6 as the contact pads of the center link absorb compressive loads exerted on the center link by various components of the suspension or the frame.

FIG. 10 illustrates that in various embodiments of the present disclosure, a center link with contact pads may experience less bending stresses than in previous designs. This decrease in the bending stresses may be attributable to the fact that the contact points and loads exerted on them are closer to the neutral axis of the center link than in previous designs. As a result, the longevity of the center link and any associated assembly using the center link (e.g. a suspension mount assembly) may be prolonged.

As earlier discussed herein, either contact pad could have a planar or arcuate contact surface. An arcuate surface may be useful in some applications because it results in the contact point being closer to the central axis of the link than a planar surface. Also, an arcuate surface, especially one with rounds at the pad edges, may improve the link's ability to move across the lower mounting member when the link is under compression and the upper and lower mounting members experience relative motion. In addition, arcuate contact surfaces and rounded contact surface edges are generally easier to form in a forging or heading process.

However, arcuate contact surfaces and round pad edges tend to increase the length of the center link. Additional length may add cost or require more room between upper and lower mounding members. The pad shape, therefore, is a balance between optimum compressive loading, space requirements, and cost.

The geometry leading into the contact pad can be straight-sided, tapered or curved. A tapered profile is generally the easiest to form and generates the least machining waste, while a straight-sided pad provides the most clearance or void volume to accommodate wear particles or other debris that may accumulate around the end of the link adjacent to the lower mounting member. A curved shape, as shown on the mushroom end employs advantages of both.

Also, looking at the contact pad from the end of the link, the pad could appear round. This is the easiest shape to form and best from the standpoint of stress. But it could also have a hex shape, square shape, rounded hex, rounded square, oval or other shape to permit it to be held by a wrench or other tool when threading the link and nut together.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A center link for use with a suspension mount assembly, the center link comprising: a shaft portion defining a longitudinal axis and a transverse axis perpendicular to the longitudinal axis, a first axial end disposed along the longitudinal axis, a second axial end disposed along the longitudinal axis, and a shaft portion transverse width; a bolt portion disposed at either the first axial end or the second axial end, the bolt portion defining a bolt portion transverse width; and a bolt portion contact pad extending longitudinally and transversely from the bolt portion, forming a bolt portion contact surface extending transversely, and defining a bolt portion contact surface transverse width that is less than the shaft portion transverse width, and the shaft portion transverse width is less than the bolt portion transverse width, wherein the shaft portion includes an at least partially cylindrical configuration including a cylindrical axis that is coincident with the longitudinal axis, a circumferential direction; a radial direction that is parallel to the transverse axis, and the shaft portion transverse width is a shaft portion diameter, the bolt portion transverse width is a bolt portion outer diameter measured in the radial direction, the bolt portion contact surface is planar, and the bolt portion contact surface transverse width is a bolt portion contact surface diameter also measured in the radial direction, and a ratio of the shaft portion diameter to the bolt portion contact surface diameter ranges from 1.5 to 2.3; a mushroom head portion disposed at the first axial end or the second axial end opposite to the bolt portion, and a mushroom head portion contact pad extending longitudinally and transversely from the mushroom head portion, and the mushroom head portion contact pad is connected to the mushroom head portion by a complex blend.

2. The center link of claim 1 wherein the shaft portion diameter ranges from 23.0 mm to 34.0 mm, and the bolt portion contact surface diameter ranges from 10.0 mm to 22.0 mm.

3. The center link of claim 1, wherein the bolt portion contact pad defines a bolt portion contact pad axial width measured along the cylindrical axis, and a ratio of the shaft portion diameter to the bolt portion contact pad axial width ranges from 8.0 to 22.0.

4. The center link of claim 3, wherein the bolt portion contact pad axial width ranges from 1.5 mm to 4.0 mm.

5. A center link for use with a suspension mount assembly, the center link comprising: a shaft portion defining a longitudinal axis and a transverse axis perpendicular to the longitudinal axis, a first axial end disposed along the longitudinal axis, a second axial end disposed along the longitudinal axis, and a shaft portion transverse width; a mushroom head portion disposed at either the first axial end or the second axial end, the mushroom head portion defining a mushroom head portion transverse width; and a mushroom head portion contact pad extending longitudinally and transversely from the mushroom head portion, forming a mushroom head portion contact surface that is arcuate, defining either the first axial end or the second axial end, and defining a mushroom head portion contact surface transverse width that is less than the shaft portion transverse width; wherein the center link further comprises a bolt portion including threads disposed at an opposite axial end than the mushroom head portion, the shaft portion includes an at least partially cylindrical configuration including a cylindrical axis that is coincident with the longitudinal axis, a circumferential direction; a radial direction that is parallel to the transverse axis, and the shaft portion transverse width is a shaft portion diameter, the mushroom head portion transverse width is a mushroom head portion outer diameter measured in the radial direction, and the mushroom head portion contact surface transverse width is an arcuate contact surface diameter projected onto a plane parallel with the radial direction, being measured in the radial direction, and a ratio of the shaft portion diameter to the arcuate contact surface diameter ranges from 1.65 to 2.88, and the mushroom head portion contact pad is connected to the mushroom head portion by a complex blend.

6. The center link of claim 5 wherein the shaft portion diameter ranges from 23.0 mm to 34.0 mm, and the arcuate contact surface diameter ranges from 8.0 mm to 20.0 mm.

7. The center link of claim 5, wherein the mushroom head portion contact surface defines an arcuate contact surface spherical radius, and a ratio of the arcuate contact surface spherical radius to the shaft portion diameter ranges from 0.3 to 3.0.

8. The center link of claim 7, wherein the arcuate contact surface spherical radius ranges from 10.0 mm to 70.0 mm.

9. A suspension mount assembly having an interior and an exterior, the suspension mount assembly comprising:
a first mounting member including a first mounting flange portion and a first bowl shaped portion extending from the first mounting flange portion toward the interior of the suspension mount assembly;
a second mounting member including a second mounting flange portion and a second bowl shaped portion extending from the second mounting flange portion toward the first bowl shaped portion of the first mounting member;
a matrix joining the first mounting member to the second mounting member, the matrix including a plurality of stiffening members and a resilient material joining the stiffening members together, the matrix defining an interior void that extends from the first mounting member to the second mounting member; and
a center link disposed in the interior void engaging the first bowl shaped portion and the second bowl shaped portion, the center link including a first contact pad disposed proximate the first bowl shaped portion and facing away from the first bowl shaped portion, and a second contact pad disposed proximate the second bowl shaped portion and facing away from the second bowl shaped portion;
wherein the first contact pad and the second contact pad face at least partially in opposite directions relative to each other, and the center link includes an at least partially cylindrical body defining a radial direction, a circumferential direction, and a cylindrical axis, and the center link further comprises:
a shaft portion defining a shaft portion diameter;
a bolt portion defining a bolt portion diameter measured in the radial direction and the first contact pad extends away from the bolt portion and defines a first contact pad diameter measured in the radial direction that is less than the bolt portion diameter, while the bolt portion diameter is greater than the shaft portion diameter, and
a mushroom head portion defining a mushroom head portion diameter measured in the radial direction, and the second contact pad extends away from the mushroom head portion and defines a second contact pad diameter measured in the radial direction that is less than the mushroom head portion diameter, and the second contact pad is connected to the mushroom head portion by a complex blend.

10. The suspension mount assembly of claim 9 further comprising a nut threaded onto the bolt portion, the nut including a nut arcuate surface that is at least partially complimentarily shaped to contact the first bowl shaped portion.

11. The suspension mount assembly of claim 10 wherein the first bowl shaped portion defines a first socket that forms a nut engaging surface that is at least partially complimentarily shaped to the nut arcuate surface.

12. The suspension mount assembly of claim 9 wherein the mushroom head portion includes a mushroom head portion arcuate surface that is at least partially complimentarily shaped to contact the second bowl shaped portion.

13. The suspension mount assembly of claim 12 wherein the second bowl shaped portion defines a second socket that forms a mushroom head engaging surface that is at least partially complimentarily shaped to the mushroom head portion arcuate surface.

14. The suspension mount assembly of claim 9 further comprising a first suspension member and the first contact pad includes a planar contact surface that contacts the first suspension member, and a second suspension member and the second contact pad includes an arcuate contact surface that contacts second the suspension member.

15. The suspension mount assembly of claim 14 wherein the suspension mount assembly defines a vertical axis, the cylindrical axis of the center link forms an oblique angle with the vertical axis, the first mounting member is an upper mounting member, the second mounting member is a lower mounting member, the first suspension member is an upper suspension member, and the second suspension member is a lower suspension member.

* * * * *